(59.)

A. W. BRINKERHOFF.

Improvement in Hand Corn Husker.

No. 4,687. Reissued Jan. 2, 1872.

*Witnesses*

J. V. Nare

M. H. Brinkerhoff

*Inventor*

Alexander W. Brinkerhoff

AM. PHOTO-LITHOGRAPHIC CO. N.Y. (OSBORNE'S PROCESS.)

UNITED STATES PATENT OFFICE.

ALEXANDER W. BRINKERHOFF, OF UPPER SANDUSKY, OHIO.

IMPROVEMENT IN HAND CORN-HUSKERS.

Specification forming part of Letters Patent No. 36,333, dated September 2, 1862; reissue No. 4,687, dated January 2, 1872.

SPECIFICATION.

Be it known that I, ALEXANDER W. BRINKERHOFF, of Upper Sandusky, in the county of Wyandot and State of Ohio, have invented new and useful Improvements in Hand Corn-Huskers; and I do hereby declare the following to be a full, clear, and exact description of the same, reference being had to the accompanying drawing, in which similar letters refer to similar parts, and in which—

Figure 1:
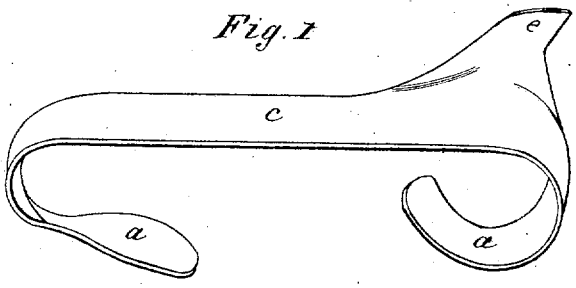
Figure 2:
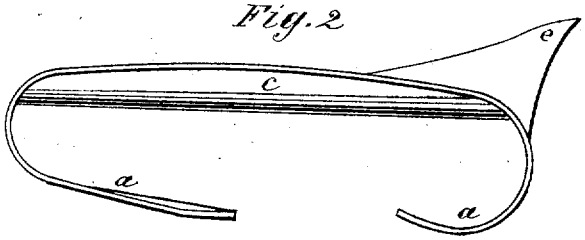
Figure 3:
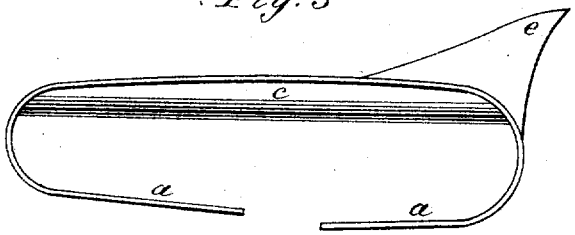

Figure 1 is a perspective view of the device. Fig. 2 is a side or edge view of the same. Fig. 3 is a like view, showing its form when used over mittens.

The nature of my invention consists in a device for husking corn, combining, in one and in itself complete, a clasp to hold the tooth in its proper position upon the hand, and a tooth, spur, or peg to open the husks on the ears of corn, and so constructed that it may be applied with or without mittens on the hand, and that it can be speedily and cheaply made by means of dies and drop-presses, or by casting, and of various sizes to suit any hand; and when applied to the hand so that the tooth, spur, or peg will at all times be in proper position across, within, or projecting beyond the hand for ready use.

To enable others skilled in the art to construct my invention, I will now describe the mode of its construction and use.

Blanks for the whole device, when made of sheet metal, may be struck out by means of dies and by drop-presses formed complete, as shown in the several devices; or the whole device, complete and perfect, may be cast of metal or any other hard and durable substance. When cast of metal they are annealed and then coated with tin so as to give them a smooth surface. Metallic devices for husking corn, and having a clasp at the end to receive the little finger and forged of iron, are old and well-known devices, as are also metallic plates having holes through them for strings, to apply them to the hand. The object of my invention is to secure a device easily and readily applied to the hand, and which will always, when applied, be in proper position for use and remain so even when the hand is open. When constructed with the clasp at the end of the device to receive the little finger, the device could not be kept in position on the hand; and when the hand was opened would drop over and hang suspended to and below the finger, causing delay and trouble. To secure a device free from these objections, and one that might be applied with mittens or gloves on, is another object of this invention.

I do not confine myself to the particular form shown in the drawing herewith; nor to any particular form of clasp and tooth; for it is very evident that the form of the device may be changed in many ways, yet, in such case, fully embrace the nature and principle of my invention.

The object of the clasp *a* being to hold the tooth, spur, or peg in position on the hand for use, it is clearly evident that the clasp or ring, or opening to apply it to the hand, need not pass around the whole hand, but may be so small as to receive but one finger, and the same result is obtained provided the clasp receives the second or third fingers and the plate or bar *c*, having upon its end the tooth, spur, or peg for opening the husk, passes across the whole hand, as does the upper part of the device, with the clasp sufficiently large to receive all the fingers; and with the clasp only large enough to receive one finger it is used by simply inserting the clasp through a slit in the mitten, with the same facility with mittens on as if it clasped the whole hand.

Thus it will be seen that I do not confine myself to any degree in size of clasp, but cover all clasps producing the results of mine.

Having thus fully described the nature and object of my invention, what I claim as new, and desire to secure by Letters Patent of the United States, is—

1. In combination with the bar *c*, a clasp extending from each end thereof for holding the same in position inside the hand, substantially as specified.

2. In combination with a bar, *c*, the spur *e*, constructed and arranged to operate substantially as shown and described.

3. A corn-husking implement having bar *c*, spur *e*, and a clasp for holding said bar in position, constructed by casting in one piece, as a new article of manufacture.

ALEXANDER W. BRINKERHOFF.

Witnesses:

D. D. HARE,

M. H. BRINKERHOFF.